United States Patent Office 2,935,500
Patented May 3, 1960

2,935,500

PROCESS AND CATALYST FOR PRODUCTION OF OLEFIN POLYMERS

Gene Nowlin, Princeton, N.J., and Harold D. Lyons, Bartlesville, Okla., assignors to Phillips Petroleum Company, a corporation of Delaware No Drawing. Application September 24, 1956
Serial No. 611,764

17 Claims. (Cl. 260—94.9)

This invention relates to the polymerization of olefins. In one aspect, this invention relates to an improved method for polymerizing olefins in the presence of a novel catalyst system.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. The most valuable polymers, however, are higher molecular weight polymers which have desirable properties of heat stability and can be molded into vessels, pipes and tubing. Such uses cannot be made of the lower molecular weight polymers, for example, a polymer having a molecular weight of about 2000, since a polymer of this molecular weight is a wax-like material.

An object of this invention, therefore, is to provide an improved process for the production of olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising a mixture of a complex metal halide corresponding to the formula $MM'X_6$, wherein M is a metal selected from the group consisting of calcium, strontium, and barium, M' is a metal of Group IV-A (Mendeleef's Periodic System), including titanium, zirconium, and hafnium, and X is a halogen, preferably fluorine or chlorine, and at least one component selected from the following: (a) a hydride or organo compound of one of the metals aluminum, gallium, indium, thallium, sodium, potassium, lithium, rubidium, cesium, beryllium, magnesium, zinc, cadmium, and mercury; (b) an organometal halide corresponding to the formula $R_nM''X_y$, wherein R is a saturated acyclic hydrocarbon radical, a saturated cyclic hydrocarbon radical, an aromatic hydrocarbon radical, or combinations of these radicals, wherein M'' is a metal selected from the group consisting of aluminum, gallium, indium, thallium, and beryllium, wherein X is a halogen, and wherein $n$ and $y$ are integers, the sum of $n$ and $y$ being equal to the valence of the metal M''; and (c) a mixture of an organic halide and at least one metal selected from the group consisting of sodium, potassium, lithium, rubidium, cesium, beryllium, magnesium, zinc, cadmium, mercury, aluminum, gallium, indium, and thallium. The improvement obtained when polymerizing an olefin in the presence of our novel catalyst is, firstly, that polymers of much higher molecular weight can be obtained than is true when certain of the prior art catalysts have been employed; and secondly, the polymerization reaction, particularly for ethylene, can be initiated and carried out at considerably lower temperatures and pressures than are necessary when employing the catalysts and processes of the prior art.

The complex metal halide component of our catalyst system comprises at least one of the compounds corresponding to the formula $MM'X_6$ wherein M is one of the group consisting of calcium, strontium, and barium, M' is one of the group consisting of titanium, zirconium, and hafnium, and X is one of the group consisting of bromine, chlorine, fluorine, and iodine. Mixtures of two or more of these complex metal halides can be employed in the practice of our invention. Any of the known or available complex salts, including calcium fluotitanate ($CaTiF_6$), calcium fluozirconate ($CaZrF_6$), strontium chlorotitanate ($SrTiCl_6$), barium bromozirconate ($BaZrBr_6$), and the like, can be employed in our process. The complex metal halides which are preferably used in the catalyst composition of this invention are calcium fluotitanate and calcium fluozirconate.

In admixture with one or more of the complex metal halides described above, our novel catalyst comprises a hydride or organo compound of the metals aluminum, gallium, indium, thallium, sodium, potassium, lithium, rubidium, cesium, beryllium, magnesium, zinc, cadmium, and mercury. The general formula for the latter compound is $M'''R''_x$, wherein $M'''$ is one of the foregoing metals, and $R''$ is hydrogen, a monovalent saturated acyclic hydrocarbon radical, a monovalent saturated cyclic hydrocarbon radical, a monovalent aromatic hydrocarbon radical or any combination thereof, and wherein $x$ is the valence of the metal, i.e., 1, 2 or 3. Examples of these compounds corresponding to the formula $M'''R''_x$ which can be used are $Al(C_6H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_3$, $Al(CH_2—(CH_2)_{18}—CH_3)_3$, $Ga(C_6H_5)_3$, $In(C_6H_5)_3$, $C_2H_5Na$, $C_3H_7K$, $C_4H_9Li$ and the like. These $M'''R''_x$ compounds can also be used in the form of their known and stable organic complexes, such as complexes with ethers, thioethers, amines, alkali metal hydrides, alkali metal alkyls or alkali metal aryls. Examples of such complex compounds which can be used in admixture with a complex metal halide as the catalyst are $LiAlH_4$, $NaAl(CH_3)_4$, $NaBe(C_6H_5)_3$, $NaBe(C_2H_5)_3$, and the like.

Alternatively, or in addition to $M'''R''_x$ compounds set forth above, our catalyst comprises a mixture of one or more of the complex metal halides and at least one organometal halide corresponding to the formula $R_nM''X_y$, wherein R is a saturated acyclic hydrocarbon radical, a saturated cyclic hydrocarbon radical, an aromatic hydrocarbon radical, or mixtures of these radicals, wherein M'' is a metal selected from the group consisting of aluminum, gallium, indium, tallium and beryllium, and wherein X is a halogen. The $n$ and $y$ are integers and the sum of $n$ and $y$ is equal to the valence of the metal M''. X can be any of the halogens, including chlorine, bromine, iodine and fluorine. The saturated acyclic hydrocarbon radicals, saturated cyclic hydrocarbons radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_4H_9)_2AlBr$, $C_8H_{17}AlI_2$, $(C_3H_7)_2GaF$, $(C_6H_{11})_2GaCl$ (cyclohexane derivative), $(C_2H_5)_2AlCl$, $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), $C_{17}H_{35}BeI$, $CH_3BeBr$ and the like.

Alternatively, or in addition to the $M'''R''_x$ compounds and/or $R_nM''X_y$ compounds set forth above, our catalyst comprises a mixture of one or more of the complex metal halides and a mixture of an organic halide and a free or elemental metal. These organic halides include chloro-, bromo-, iodo-, and fluoro-substituted organic halides, and can be mono-, di-, tri-, or tetra-substituted organic halides. Within the broad class of organic halides which is a component of our novel catalyst composition, the class of halides defined as monohalogen-substituted hydrocarbons having a maximum carbon chain length of not greater than 8 carbon atoms are preferred since they are more easily handled in a commercial operation and are active to initiate the polymerization of olefins in the catalyst composition of this invention. Still more desirably, the organic halide which is used in the catalyst is a lower alkyl monohalide having a maximum carbon chain length of not greater than 8 carbon atoms. Examples of these organic halides which can be used in the catalyst are ethyl bromide, propyl chloride, butyl iodide and pentyl fluoride. Other examples are 1,2-dibromoethane, 1,3-dibromopropane, 1,2,3-tribromopropane, 1,2,3-trichloropropane, 1,1-difluoroethane, and 1,4-diiodobutane. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride and phenyl chloride. Also alkenyl halides, such as allyl bromide, and alkynyl halides, such as propargyl chloride, can be used. The metals which are employed in admixture with an organic halide include one or more of sodium, potassium, lithium, rubidium, cesium, beryllium, magnesim, zinc, cadmium, mercury, aluminum, gallium, indium, and thallium. The metals are usually used in the form of shavings, turnings or finely divided powder. Various mixtures or combinations of the above-mentioned organic halides and metals can be employed in the catalyst composition of this invention.

As has been indicated, all possible combinations of a hydride or organo compound corresponding to the formula $M'''R''_x$ and/or an organometal halide corresponding to the formula $R_nM''X_y$ and/or a mixture of an organic halide and a free or elemental metal as set forth above with one or more of the complex metal halides are used in the catalyst composition of this invention. The catalyst compositions falling within the scope of this disclosure which are preferred because their use to catalyze the polymerization of olefins provides relatively high molecular weight polymers and/or permits the use of relatively low reaction temperatures and pressures are the following: a mixture of calcium fluotitanate with an approximately equimolar mixture of ethylaluminum dichloride and diethylaluminum chloride; a mixture of calcium fluotitanate and thiethylaluminum; a mixture of calcium fluotitanate and lithium aluminum hydride; a mixture of calcium fluotitanate, ethyl bromide and free or elemental magnesium; and a mixture of calcium fluozirconate with an approximately equimolar mixture of ethylaluminum dichloride and diethylaluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of organometal compound to complex metal halide will usually be in the range of 0.05 to 50, preferably 0.1 to 5, mols of organometal compound per mol of complex metal halide. The ratio of organometal halide to complex metal halide will be in the range of 0.05 to 50, preferably 0.1 to 5, moles of organometal halide per mol of complex metal halide. The ratio of the amounts of organic halide, metal and complex metal halide will be in the range of 0.02 to 50 mols of the organic halide per mol of the complex metal halide and from 0.02 to 50 mols of the metal per mol of the complex metal halide. A preferred ratio is from 0.1 to 5 mols of organic halide per mol of complex metal halide and from 0.1 to 5 mols of metal per mol of the complex metal halide.

The materials which are polymerized in accordance with this invention are polymerizable hydrocarbons, broadly. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylenes can be used, such as butene-2, pentene-2, hexene-2, heptene-3, 2-methyl-butene-1, 2-methyl-hexene-1, 2-ethylheptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example by copolymerizing ethylene and propylene, ethylene and 1-butene, propylene, propylene and 1-butene, or propylene and a pentene. Also, aryl olefins, e.g., styrene and alkyl-substituted styrenes can be polymerized to a solid polymer in the process of this invention.

This invention is also applicable to the polymerization of a monomeric material comprising conjugated dienes containing from 4 to 8, inclusive, carbon atoms. Examples of conjugated dienes which can be used include 1,3-butadiene, 2-methyl-1,3-butadiene, 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene, and the like. It is within the scope of the invention to polymerize such conjugated dienes either alone or in admixture with each other and/or with one or more other compounds containing an active $CH_2=C<$ group which are copolymerizable therewith. Included among these latter compounds are monoolefins, such as those described hereinabove. Other examples of compounds containing an active $CH_2=C<$ group which are copolymerizable with one or more conjugated dienes are styrene, acrylonitrile, methacrylonitrile, methacrylate, methyl methacrylate, vinyl acetate, vinyl chloride, 2-methyl-5-vinylpyridine, 2-vinylpyridine, 4-vinylpyridine, and the like.

One of the important advantages obtained in the polymerization of olefins in the presence of our novel catalyst is that lower temperatures and pressures can be used than in certain of the prior art processes. The temperature can be varied over a rather broad range, however, such as from zero to 500° F. The preferred temperature range is from 100 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set fortht above has been found to produce solid polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane are especially useful when the process is carried out at low temperatures. However, the higher molecular weight paraffins and cycloparaffins, such as isooctane, cyclohexane and methylcyclohexane, and aromatic diluents, such as benzene, toluene and the like, can also be used, particularly when operating at higher temperatures. Halogenated hydrocarbons, such as halogenated aromatics, halogenated paraffins, halogenated cycloparaffins and the like, are also useful as diluents. Mixtures of any two or more of the above-named diluents can also be employed in the process of this invention.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 100 to 300° F., falls within the range of one second to an hour or more. In the batch process, the time for the reaction can also vary widely, such as up to 24 hours or more.

It has been found that various materials in some instances may have a tendency to inactivate the catalyst compositions of this invention. These materials include carbon dioxide, oxygen and water. Therefore, it is usually desirable to free the polymerizable hydrocarbon from these materials, as well as from other materials which may tend to inactivate the catalyst before contacting the hydrocarbon with the catalyst. Any of the known means for removing such contaminants can be employed. When a diluent is used in the process, this material should generally be freed of contaminants, such as water, oxygen, and the like. It is desirable, also, that air and moisture be removed from the reaction vessel before the reaction is carried out. However, in some cases small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess olefin is vented and the contents of the reactor, including the solid polymer swollen with diluent, are then treated to inactivate the catalyst and remove the catalyst residues. The inactivation of the catalyst can be accomplished by washing with an alcohol, water or other suitable material. In some instances, the catalyst inactivating treatment also removes a major proportion of the catalyst residues while in other cases it may be necessary to treat the polymer with an acid, base or other suitable material in order to effect the desired removal of the catalyst residues. The treatment of the polymer may be carried out in a comminution zone, such as a Waring Blendor, so that a finely divided polymer is thereby provided. The polymer is then separated from the diluent and treating agents, e.g., by decantation or absorption, after which the polymer is dried. The diluent and treating agents can be separated by any suitable means, e.g., by fractional distillation, and reused in the process.

A more comprehensive understanding of the invention may be obtained by referring to the following illustrative example which is not intended, however, to be unduly limitative.

EXAMPLE

A run was made in which ethylene was polymerized to a high molecular weight solid polymer using a mixture of diethylaluminum chloride and ethylaluminum dichloride, and calcium fluotitanate as the polymerization catalyst.

The mixture of diethylaluminum chloride and ethylaluminum dichloride was prepared by placing 225 grams of aluminum powder, 250 cubic centimeters of cetane and a trace of iodine in a flask fitted with a stirrer, a thermowell, a pre-purified nitrogen inlet tube, an ethyl chloride induction tube and a condenser. After these materials were charged, the system was flushed with prepurified nitrogen, after which a nitrogen atmosphere was maintained in the reactor. The suspension was then heated to 150° C. and stirred vigorously while adding ethyl chloride continuously in the liquid phase. The temperature was maintained in the range of 150 to 180° C. during the consumption of ethyl chloride which ceased after about eight hours. The mixture was then cooled to room temperature, and 225 grams of additional aluminum powder was added. The temperature was then raised to 110° C., and ethyl chloride was added as before. The total time for the addition of the ethyl chloride was 12 to 16 hours. The product was recovered by distillation in an atmosphere of pre-purified nitrogen. Two fractions, boiling at 78 to 80° C. and 78 to 86° C. at 5 mm. mercury pressure were collected. The lower boiling of the two fractions amounted to 1213 grams, and this fraction was found to contain 49.4 percent chlorine by weight. The other fraction amounted to 301 grams and contained 45.5 percent chlorine by weight. The theoretical chlorine content for an equimolar mixture of diethylaluminum chloride and ethylaluminum dichloride is 43 weight percent. The lower boiling fraction was diluted with cyclohexane to form a solution which contained 29 percent by weight of the equimolar mixture of diethylaluminum chloride and ethylaluminum dichloride.

Ethylene was polymerized in a 1400 milliliter stainless steel rocking autoclave in the presence of one gram of calcium fluotitanate ($CaTiF_6$) and 12 cubic centimeters (approximate density—0.93) of the ethylaluminum sesquichloride solution in cyclohexane as prepared above. The autoclave was charged with 400 cubic centimeters of cyclohexane (dried over sodium and distilled) prior to the addition of the catalyst components. The reactor was flushed with nitrogen prior to and during the charging procedure to prevent contact of the catalyst with air or moisture. The ethylene feed was passed through a purification system to remove oxygen, carbon dioxide and water vapor prior to entering the reactor. The purification system comprised a pyrogallol solution, a sodium hydroxide solution and drying agents.

Ethylene was added to the autoclave containing the cyclohexane and catalyst until a pressure of 300 p.s.i.g. was reached, with the autoclave and contents at a temperature of 82° F. The reactor and contents were heated for approximately 14 minutes, after which time the temperature was 95° F., and the pressure was 350 p.s.i.g. Heating was continued, and after 33 minutes the temperature was 125° F., while the pressure had fallen to 200 p.s.i.g. Ethylene was introduced into the reactor until the pressure reached 300 p.s.i.g., and after 27 minutes the pressure had fallen to 190 p.s.i.g. with the temperature remaining at 125° F. The reactor was then repressured with ethylene until a pressure of 450 p.s.i.g. was reached. During the next 70 minutes, the temperature remained relatively constant, while the pressure dropped to 200 p.s.i.g. At this point, the reactor was again pressured to 300 p.s.i.g. with ethylene. After 110 minutes, the pressure had fallen to zero p.s.i.g., while the temperature was 125° F.

The reactor was then opened and found to contain polymer swollen with cyclohexane. The polymer was removed from the reactor and comminuted in a Waring Blendor in the presence of isopropyl alcohol. The finely divided polymer was then separated from the liquid by filtration and dried overnight in a vacuum oven maintained at about 140° F., and at a pressure of less than 10 mm. mercury (absolute). Sixty-six grams of polymer was obtained.

The properties of a compression molded sample of this ethylene polymer are presented below in the table.

Table

| | |
|---|---|
| Density, grams/cc. at room temperature | 0.989 |
| Melting point, ° F. | 252±2 |
| Color | Buff |
| Ash, weight percent | 1.27 |
| Inherent viscosity[1] | 1.027 |
| Molecular weight (based on inherent viscosity | 25,110 |

[1] The inherent viscosity was obtained at 130° C., using a solution of 0.2 gram of polymer per 100 milliliters of tetralin.

The polymers produced in accordance with this invention have utility in applications where solid plastics are used. They can be used to impregnate paper and fabrics, and they can be molded to form articles of any desired shape, such as bottles and other containers for liquids. Furthermore, they can be formed into pipe by extrusion.

It will be apparent to those skilled in the art that variations and modifications of our invention can be made upon study of the foregoing disclosure. Such variations and modifications are believed to be clearly within the spirit and scope of the invention.

We claim:

1. A method for producing a solid polymer of an aliphatic 1-olefin having up to and including 8 carbon atoms per molecule which comprises contacting said olefin with a catalyst comprising a complex metal halide of the formula $MM'X_6$, wherein M is a member selected from the group consisting of calcium, strontium and barium, M' is a metal selected from the group consisting of titanium, zirconium and hafnium, and X is a halogen, and a member selected from the group consisting of (a) a compound of the formula $M'''R''_x$, wherein M''' is a metal selected from the group consisting of aluminum, gallium, indium and thallium, R'' is an alkyl radical, and $x$ is equal to the valence of the metal M'', (b) a complex hydride of an alkali metal and a metal selected from the group consisting of aluminum, gallium, indium and thallium, (c) an organometal halide of the formula $R_nM''X_y$, wherein R is an alkyl radical, M'' is a metal selected from the group consisting of aluminum, gallium, indium and thallium, X is a halogen, and $n$ and $y$ are integers, the sum of $n$ and $y$ being equal to the valence of the metal M'', and (d) a mixture of an alkyl halide and a metal selected from the group consisting of magnesium, zinc, cadmium and mercury, at a temperature in the range from zero to 500° F., in the presence of a hydrocarbon diluent, inert and liquid under conditions of the method, and at a pressure sufficient to maintain said diluent in liquid phase, and recovering the solid polymer so produced.

2. A method in accordance with claim 1 wherein the ratio of the amount of said complex metal halide and said members (a), (b), and (c) in said catalyst is in the following range: from 0.05 to 50 mols of said member (a) per mol of said complex metal halide; from 0.05 to 50 mols of said member (b) per mol of said complex metal halide; and from 0.02 to 50 mols of said organic halide and from 0.02 to 50 mols of said free metal in said member (c) per mol of said complex metal halide.

3. A method in accordance with claim 1 wherein the ratio of the amount of said complex metal halide and said members (a), (b), and (c) in said catalyst is in the following range: from 0.1 to 5 mols of said member (a) per mol of said complex metal halide; from 0.1 to 5 mols of said member (b) per mol of said complex metal halide; and from 0.1 to 5 mols of said organic halide and from 0.1 to 5 mols of said free metal in said member (c) per mol of said complex metal halide.

4. A method for polymerizing ethylene which comprises, contacting ethylene with a catalyst consisting essentially of a mixture of from 0.1 to 5 mols of an approximately equimolar mixture of diethylaluminum chloride and ethylaluminum dichloride per one mol of calcium fluotitanate, in the presence of a hydrocarbon diluent, inert and liquid under conditions of the method at a temperature in the range from 100 to 350° F. and a pressure in the range from 100 to 1000 p.s.i.g.

5. A catalyst composition consisting essentially of a mixture of calcium fluotitanate, diethylaluminum chloride and ethylaluminum dichloride.

6. A catalyst composition consisting essentially of a mixture of calcium fluotitanate and triethylaluminum.

7. A catalyst composition consisting essentially of a mixture of calcium fluotitanate and lithium aluminum hydride.

8. A catalyst composition consisting essentially of a mixture of calcium fluotitanate, ethyl bromide and elemental magnesium.

9. A catalyst composition consisting essentially of a mixture of calcium fluozirconate, diethylaluminum chloride and ethylaluminum dichloride.

10. A method for polymerizing ethylene which comprises contacting said ethylene with a catalyst consisting essentially of a mixture of calcium fluotitanate and an approximately equimolar mixture of ethylaluminum dichloride and diethylaluminum chloride.

11. A method for polymerizing ethylene which comprises contacting said ethylene with a catalyst consisting essentially of a mixture of calcium fluotitanate and triethylaluminum.

12. A method for polymerizing ethylene which comprises contacting said ethylene with a catalyst consisting essentially of a mixture of calcium fluotitanate and lithium aluminum hydride.

13. A method for polymerizing ethylene which comprises contacting said ethylene with a catalyst consisting essentially of a mixture of calcium fluotitanate, ethyl bromide and elemental magnesium.

14. A method for polymerizing ethylene which comprises contacting said ethylene with a catalyst consisting essentially of a mixture of calcium fluozirconate and an approximately equimolar mixture of ethylaluminum dichloride and diethylaluminum chloride.

15. A method for producing a solid polymer of an aliphatic 1-olefin having up to and including 8 carbon atoms per molecule which comprises contacting said olefin with a catalyst comprising a complex metal halide of the formula $MM'X_6$, wherein M is a member selected from the group consisting of calcium, strontium and barium, M' is a metal selected from the group consisting of titanium, zirconium and hafnium, and X is a halogen, and a member selected from the group consisting of (a) a compound of the formula $M'''R''_x$, wherein M''' is a metal selected from the group consisting of aluminum, gallium, indium and thallium, R″ is an alkyl radical, and $x$ is equal to the valence of the metal M‴, (b) a complex hydride of an alkali metal and a metal selected from the group consisting of aluminum, gallium, indium and thallium, (c) an organometal halide of the formula $R_nM″X_y$, wherein R is an alkyl radical, M″ is a metal selected from the group consisting of aluminum, gallium, indium and thallium, X is a halogen, and $n$ and $y$ are integers, the sum of $n$ and $y$ being equal to the valence of the metal M″, and (d) a mixture of an alkyl halide and a metal selected from the group consisting of magnesium, zinc, cadmium and mercury.

16. A catalyst composition comprising a complex metal halide of the formula $MM'X_6$, wherein M is a member selected from the group consisting of calcium, strontium and barium, M′ is a metal selected from the group consisting of titanium, zirconium and hafnium, and X is a halogen, and a member selected from the group consisting of (a) a compound of the formula $M‴R″_x$, wherein M‴ is a metal selected from the group consisting of aluminum, gallium, indium and thallium, R″ is an alkyl radical, and $x$ is equal to the valence of the metal M‴, (b) a complex hydride of an alkali metal and a metal selected from the group consisting of aluminum, gallium, indium and thallium, (c) an organometal halide of the formula $R_nM″X_y$, wherein R is an alkyl radical, M″ is a metal selected from the group consisting of aluminum, gallium, indium and thallium, X is a halogen, and $n$ and $y$ are integers, the sum of $n$ and $y$ being equal to the valence of the metal M″, and (d) a mixture of an alkyl halide and a metal selected from the group consisting of magnesium, zinc, cadmium and mercury.

17. A method for polymerizing ethylene which comprises contacting said ethylene with a catalyst consisting essentially of a mixture of calcium fluotitanate and an alkyl aluminum chloride.

References Cited in the file of this patent

UNITED STATES PATENTS

| | | |
|---|---|---|
| 2,827,446 | Hogan et al. | Mar. 4, 1958 |
| 2,868,772 | Ray et al. | Jan. 13, 1959 |

FOREIGN PATENTS

| | | |
|---|---|---|
| 533,362 | Belgium | May 16, 1955 |

UNITED STATES PATENT OFFICE

CERTIFICATE OF CORRECTION

Patent No. 2,935,500  May 3, 1960

Gene Nowlin et al.

It is hereby certified that error appears in the printed specification of the above numbered patent requiring correction and that the said Letters Patent should read as corrected below.

Column 7, line 60, for "$M''$" read -- $M'''$ --.

Signed and sealed this 18th day of October 1960.

(SEAL)
Attest:

KARL H. AXLINE
Attesting Officer

ROBERT C. WATSON
Commissioner of Patents